United States Patent [19] [11] 4,369,051
Parbhoo et al. [45] Jan. 18, 1983

[54] APPARATUS FOR HANDLING LINEAR ELEMENTS

[75] Inventors: Kantilal R. Parbhoo, Reynoldsburg, Ohio; Fred McMinn, Pendleton, S.C.

[73] Assignee: Owens-Corning Fiberglas Corporation, Toledo, Ohio

[21] Appl. No.: 288,387

[22] Filed: Jul. 30, 1981

[51] Int. Cl.³ ............................................ C03B 37/025
[52] U.S. Cl. ...................................... 65/10.1; 65/11.1; 118/78; 118/118; 118/125
[58] Field of Search ........................... 65/2, 10.1, 11.1; 118/78, 118, 125

[56] References Cited
U.S. PATENT DOCUMENTS
4,309,202 1/1982 Parbhoo ............................ 65/10.1 X Primary Examiner—Robert L. Lindsay, Jr.
Attorney, Agent, or Firm—Ronald C. Hudgens; Philip R. Cloutier; Kenneth H. Wetmore

[57] ABSTRACT

The present invention embraces apparatus for the production of mineral fibers such as glass fibers. In particular, the apparatus comprises a guide member for gathering filaments into side-by-side strands wherein the guide member has a locating hole and support means for holding the guide member normal to the side-by-side strands. The support means comprises a supporting member, a pin member extending upwardly from the support member for positioning the guide member thereon at the locating hole, and an adjustable member extending from the support member and adapted to support the guide member so that the guide member is held above the support member by the pin and the adjustable member.

7 Claims, 6 Drawing Figures

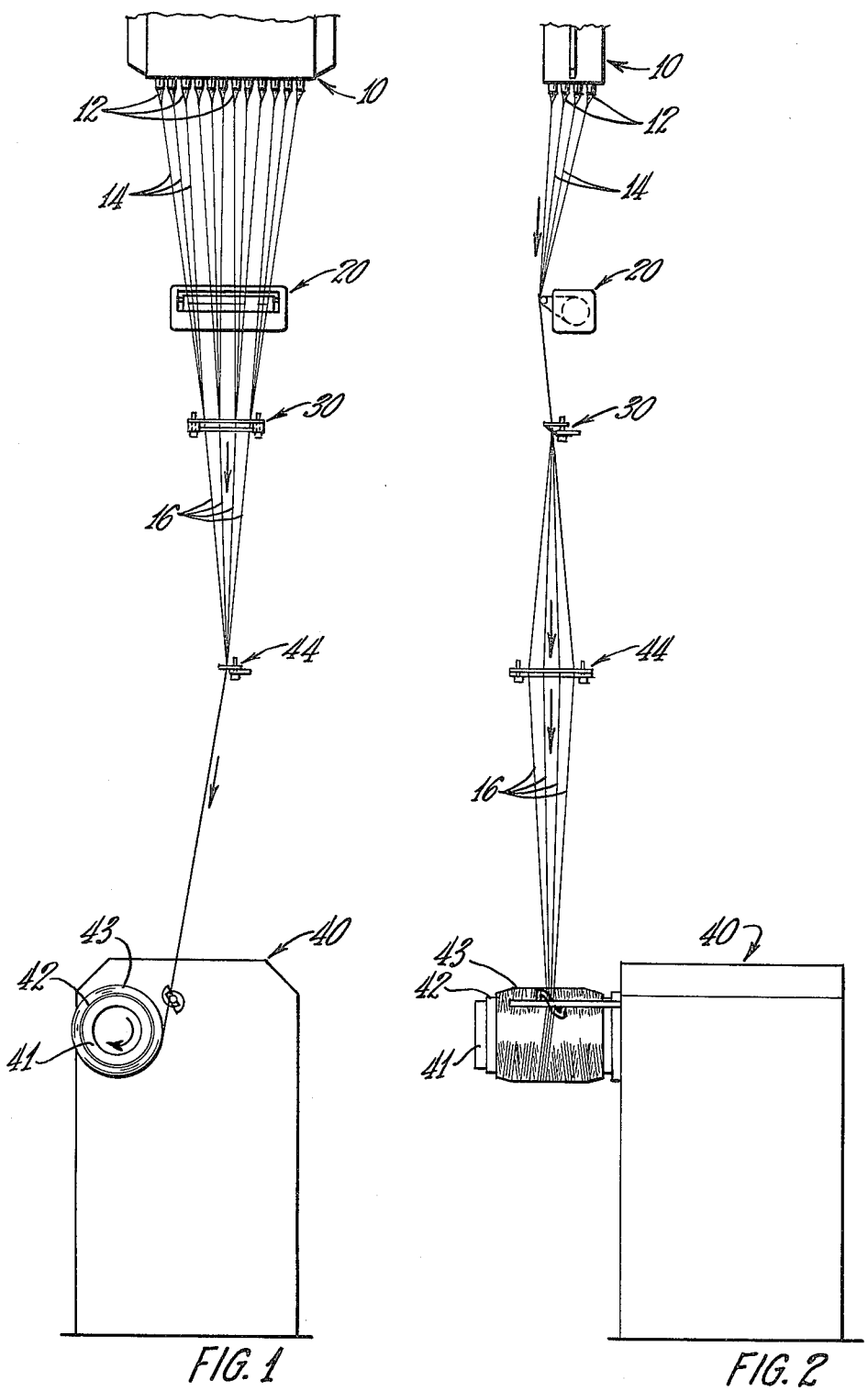

APPARATUS FOR HANDLING LINEAR ELEMENTS

TECHNICAL FIELD

The invention relates to apparatus for producing fibers from heat softened mineral material, such as glass. More specifically, this invention relates to improved guide support means for handling linear elements such as glass strands.

BACKGROUND ART

In processing continuous filament glass strands and rovings, it is sometimes necessary to supply simultaneously more than one individual strand or roving to one or more packages, but prior apparatus has failed to function fully satisfactorily in such operations.

It has been a practice to use guide members or "shoes" to establish desired spaced apart side-by-side operating strand paths along which strands advance to a collecting package or packages. These guide members have been of varying shapes, such as, for example, that shown and discussed in U.S. Pat. No. 3,821,543.

There have been difficulties with conventional guide members in the fiber forming operation. A guide member is positioned below the applicator apparatus which applies a liquid coating to the filaments. There has been a problem with the alignment of the guide member in relation to the coated filaments. In practice, the guide member may not be held normal to the strand path, and thus, stripping or wiping of the coating material from the filaments onto the guide member can occur. This stripping of the size material causes loss of control of the coating on the filaments and results in the waste of size material. These problems can significantly affect the economic operation of a fiber forming operation.

An improvement is needed.

SUMMARY OF THE INVENTION

The present invention comprises apparatus for producing continuous mineral filaments such as glass fibers. More specifically, the apparatus comprises a guide member for gathering filaments into a side-by-side strands wherein the guide member has a locating hole and support means for holding the guide member normal to the side-by-side strands. The support means comprises a support member, a pin member extending upwardly from the support member for positioning the guide member thereon at the locating hole and an adjustable member extending from the support member and adapted to support the guide member so that the guide member is held above the support member by the pin and the adjustable member.

An object of the invention is an improved apparatus for the production of mineral fibers.

Another object of the invention is an improved guide member support means.

These and other objects of the invention will become more apparent as the invention is described hereinafter in detail with reference to the accompanying drawings.

DESCRIPTION OF THE DRAWINGS

FIG. 1 is a front elevation view of apparatus according to the principles of the invention simultaneously collecting a plurality of side-by-side glass strands into a single wound package in a continuous glass filament forming operation.

FIG. 2 is a side elevation view of the apparatus shown in FIG. 1.

DESCRIPTION OF THE PREFERRED EMBODIMENTS

Figure 3:
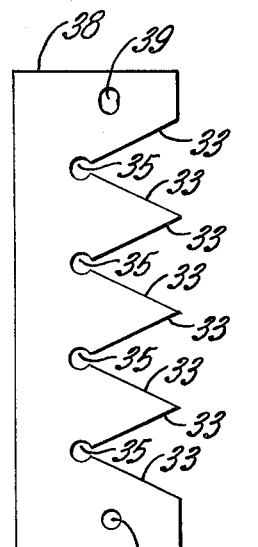
FIG. 3 is an enlarged top view of the guide member of the upper guide assembly shown in FIGS. 1 and 2.

Before explaining the present invention in detail, it is to be understood that the invention is not limited in application to the details of construction and arrangements of the parts illustrated in the accompanying drawings, since the invention is capable of other embodiments and of being practiced or carried out in various ways to produce elements for other end uses. Also, it is to be understood that the phraseology employed herein is for the purpose of description and not of limitation.

While the apparatus of the invention has particular utility in the processing of glass for forming fibers or filaments, it is to be understood that the apparatus may be employed for producing fibers of other materials.

FIGS. 1 and 2 show a continuous filament forming operation where apparatus gathers continuous glass filaments into a number of side-by-side bundles or strands. A winder pulls the side-by-side oriented glass strands downwardly along given paths and collects them as a single wound package. A guide member combines the glass filaments into an initial generally planar array of side-by-side strands; another strand guide means, which is below the first means, turns the array of strands for collection into the wound package by the winder.

As illustrated, a container or feeder assembly 10 holds a supply of molten glass. The container includes a bottom wall which has a plurality of orifices or passageways for delivering streams of molten glass 12 for attenuation into fibers 14.

The filaments 14 are protected by an application of a conventional liquid sizing or other coating material by applicator assembly 20. The applicator assembly is positioned immediately above the upper guide assembly in the fiber forming operation. This guide assembly 30 gathers the filaments into groups of side-by-side strands 16. The side-by-side strands continue to travel downwardly and pass over a second or lower guide member which positions the strands for collection by the winder apparatus 40. The strands are collected into a package 43 on a collection tube 42 positioned on the winder assembly collet 41.

In such a fiber forming operation, it is important to meter the correct amount of sizing or coating material on the filaments during the applicator process and then to retain the desired coating thereon through the process. Filaments which do not have the proper sizing or coating material thereon can be a lower quality product. If excess material is applied to the filaments, it can also result in lower quality material and/or a more expensive operation in that coating material is wasted. Thus, maintaining the metered size material on the filaments is important.

One difficulty that has arisen in the conventional fiber forming process is the stripping of size or coating material from the filaments as they pass over the upper guide member.

Figure 6:
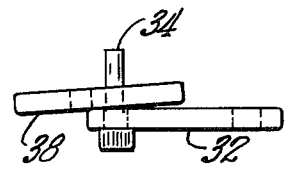
FIG. 6 is a side view of a guide member positioned on a support means other than that of the present invention.

FIG. 6 illustrates a conventionally supported guide member. As can be seen, guide member 38 is not held horizontal and thus is not normal to the path of fibers moving across it. This can cause a stripping of the sizing or coating material from the filaments onto the guide member. This stripped material is wasted and can be a costly housekeeping problem for the operation. As shown in FIG. 6, the guide member is positioned on the support means 32 and can become "glued" there by the excess sizing or coating material.

Figure 4:
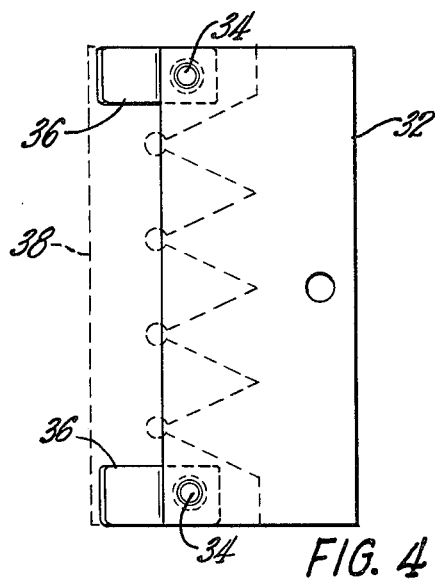
FIG. 4 is an enlarged top view of the support means of the upper guide assembly shown in FIGS. 1 and 2.
Figure 5:
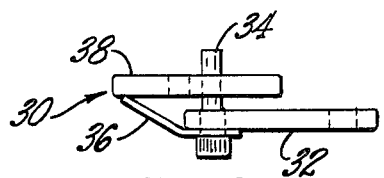
FIG. 5 is a side view of the guide member of FIG. 3 in position with the support means of FIG. 4.

The guide member and supporting means shown in FIGS. 3, 4 and 5 overcomes the difficulties described regarding the apparatus shown in FIG. 6. Guide member 38 has guide surfaces 33 and recesses 35 for gathering the freshly coated filaments into side-by-side strands. The guide member has locating holes 39 for positioning the guide member on the pin members 34 of the support means. Also extending from the support means are adjustable members 36 adapted to support the guide member 38 so that the guide member is held above the support member by the pins and the adjustable members.

As shown in FIG. 5, the guide member is positioned in spaced apart parallel relationship with the support member. Thus, the problem of having the guide member and the support member becoming "glued" together by excess coating material is overcome. The adjustable member can be constructed of a metallic material so that during operation the adjustable member can be manipulated to position the guide member normal to the strands as they pass through the guide member. Thus, by keeping the guide member in position perpendicular to the strand line, the stripping of material from the freshly coated filaments is substantially reduced.

The strand guide assembly 44 positioned downstream in the process to turn the side-by-side strands for collection on the winder can be of a construction as discussed in regard to assembly 30. However, in practice it has been found that the majority of the size or coating stripping problems take place at the first gathering shoe in the process. Thus, the lower or secondary guide assembly is less critical to the process and can be of conventional construction.

Having described the invention in detail, it will be understood that such specifications are given for the sake of explanation. Various modifications and substitutions other than those cited may be made without departing from the scope of the invention as described in the following claims.

INDUSTRIAL APPLICABILITY

The present invention would be useful in the mineral fiber forming art and, in particular, in the glass fiber forming art.

We claim:

1. Apparatus for producing continuous mineral filaments comprising:
   a. means for supplying streams of molten mineral material for attenuation into filaments which are gathered into strands;
   b. means for coating the filaments;
   c. a guide member for gathering the filaments into side-by-side strands, the guide member having a locating hole;
   d. support means for holding the guide member normal to the side-by-side strands, the support means comprising a support member, a pin member extending upwardly from the support member for positioning the guide member thereon at the locating hole, and an adjustable member extending from the support member and adapted to support the guide member so that the guide member is held normal to the side-by-side strands and above the support member by the pin and the adjustable member; and
   e. means for attenuating the streams into fibers.

2. The apparatus of claim 1 wherein the guide member has locating holes and the support means has pin members.

3. The apparatus of claim 1 wherein the adjustable member comprises a metallic material.

4. Apparatus for guiding coated mineral filaments during the manufacture of such filaments comprising:
   a. a guide member for gathering the coated mineral filaments into side-by-side strands, the guide member having a locating hole;
   b. support means for holding the guide member normal to the side-by-side strands, the support means comprising a support member, a pin member extending upwardly from the support member, for position of the guide member thereon at the locating hole, and an adjustable member extending from the support member and adapted to support the guide member so that the guide member is held normal to the strands by the pin and the adjustable member.

5. The apparatus of claim 4 wherein the guide member is held in spaced apart parallel relationship with the support member by the adjustable member and the pin.

6. The apparatus of claim 4 where the guide member has locating holes and the support means has pin members.

7. The apparatus of claim 4 wherein the adjustable member comprises a metallic material.

* * * * *